United States Patent [19]
Thomas

[11] Patent Number: 5,855,449
[45] Date of Patent: Jan. 5, 1999

[54] COUPLING BETWEEN STEERING SHAFT AND STEERING WHEEL

[75] Inventor: Steven Mark Thomas, Saginaw, Mich.

[73] Assignee: General Motors Corporation, Detroit, Mich.

[21] Appl. No.: 871,138

[22] Filed: Jun. 9, 1997

[51] Int. Cl.[6] .................................................. B25G 3/00
[52] U.S. Cl. ...................... 403/262; 403/322.1; 403/325; 403/328; 403/374.2; 74/552
[58] Field of Search .................................. 403/315, 316, 403/319, 321, 322, 325, 327, 328, 374, 262, 380; 74/552, 553, 492

[56] References Cited

U.S. PATENT DOCUMENTS

| | | |
|---|---|---|
| 1,438,004 | 12/1922 | Vincent . |
| 1,600,456 | 9/1926 | Diekmann . |
| 1,640,763 | 8/1927 | Geyer et al. . |
| 2,448,817 | 9/1948 | McArthur ................................ 403/321 |
| 3,827,816 | 8/1974 | Knapp et al. ........................ 403/325 X |
| 4,216,568 | 8/1980 | Anderson .............................. 24/136 A |
| 4,229,994 | 10/1980 | Plamper ..................................... 74/552 |
| 4,603,998 | 8/1986 | Bober et al. ........................ 403/325 X |
| 4,636,107 | 1/1987 | Casler et al. ........................ 403/329 X |
| 4,884,469 | 12/1989 | Wrigley ..................................... 74/552 |
| 4,892,007 | 1/1990 | Haldric et al. ............................. 74/552 |
| 4,901,544 | 2/1990 | Jang ...................................... 74/552 X |
| 4,917,524 | 4/1990 | Wilcox ................................. 74/552 X |
| 5,172,607 | 12/1992 | Wu ............................................ 74/552 |
| 5,281,045 | 1/1994 | Ichikawa ................................. 403/325 |
| 5,398,946 | 3/1995 | Quiring ..................................... 279/30 |
| 5,536,106 | 7/1996 | Landis et al. ............................ 403/374 |
| 5,577,859 | 11/1996 | Nau ......................................... 403/325 |
| 5,588,337 | 12/1996 | Milton ....................................... 74/552 |

FOREIGN PATENT DOCUMENTS 37 27 638 A1  3/1988  Germany .

*Primary Examiner*—Daniel P. Stodola
*Assistant Examiner*—Bruce A. Lev
*Attorney, Agent, or Firm*—Saul Schwartz; Dean Ellis

[57] ABSTRACT

A coupling between a motor vehicle steering shaft and a motor vehicle steering wheel including a primary socket on the steering wheel, a hub on the steering shaft plugged into the primary socket, a pair of V-shaped notches in the plug and in the primary socket cooperating in defining a polygonal chamber, and a cylindrical coil spring wedged in the polygonal chamber. The cylindrical coil spring thrusts the plug laterally against the primary socket to eliminate dimensional clearance, i.e., lash, therebetween. Lugs on the primary socket seat in notches in the plug and cooperate with the coil spring in transferring torque between the hub and the primary socket. A retractor on the steering wheel twists the coil spring to a smaller diameter concurrent with linear translation of the retractor in an arc around the primary socket thereby to reduce the diameter of the coil spring for installation and/or removal of the hub from the primary socket. A latch on the retractor and a plunger on the hub cooperate in automatically releasing the coil spring for expansion between the V-shaped notches concurrent with the hub being plugged into the primary socket.

6 Claims, 5 Drawing Sheets

COUPLING BETWEEN STEERING SHAFT AND STEERING WHEEL

TECHNICAL FIELD

This invention relates to a coupling between a motor vehicle steering shaft and a motor vehicle steering wheel.

BACKGROUND OF THE INVENTION

Commonly, a motor vehicle steering wheel is retained on the end of a motor vehicle steering shaft by a nut on the shaft clamped against the center of the steering wheel. The nut in the center of the steering wheel complicates the task of accommodating additional elements on the steering wheel, e.g., supplemental inflation restraint apparatus, and delays the attachment of such additional elements until after the steering wheel is mounted on the steering shaft and secured by the nut. U.S. Pat. No. 5,536,106, issued Jul. 16, 1996 and assigned to the assignee of this invention, describes a coupling between a motor vehicle steering shaft and a motor vehicle steering wheel in which a plunger on the steering wheel snaps into a notch in the steering shaft when a polygonal-shaped end of the steering shaft is plugged into a correspondingly-shaped socket in the steering wheel. A coupling according to this invention between a motor vehicle steering shaft and a motor vehicle steering wheel is a novel alternative to the coupling described in the aforesaid U.S. Pat. No. 5,536,106.

SUMMARY OF THE INVENTION

This invention is a new and improved coupling between a motor vehicle steering shaft and a motor vehicle steering wheel including a primary socket on the steering wheel, a hub on the steering shaft plugged into the primary socket, a pair of V-shaped notches in the hub and in the primary socket cooperating in defining a polygonal chamber, and a cylindrical coil spring wedged in the polygonal chamber. The cylindrical coil spring thrusts the hub laterally against the primary socket to eliminate dimensional clearance, i.e., lash, therebetween. Lugs on the primary socket seat in notches in the hub and cooperate with the coil spring in transferring torque between the hub and the primary socket. A retractor twists the coil spring to a smaller diameter concurrent with linear translation of the retractor in an arc around the primary socket thereby to reduce the diameter of the coil spring for installation and/or removal of the hub from the primary socket. A latch on the retractor and a plunger on the hub cooperate in automatically releasing the coil spring for expansion between the V-shaped notches concurrent with the hub being plugged into the primary socket.

DESCRIPTION OF THE PREFERRED EMBODIMENT

Figure 1:
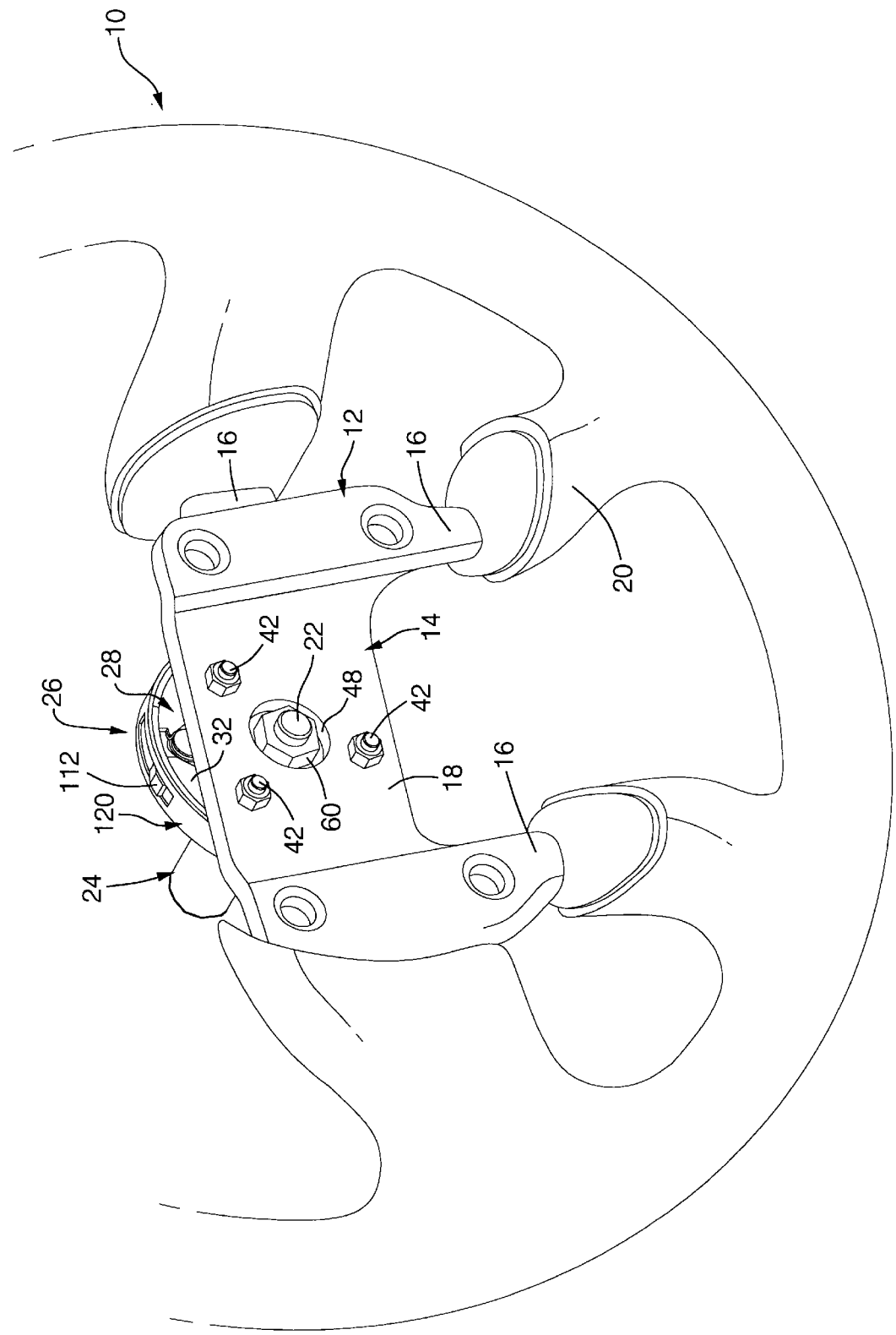
FIG. 1 is a fragmentary perspective view of a motor vehicle steering wheel coupled to a motor vehicle steering shaft by a coupling according to this invention.
Figure 4:
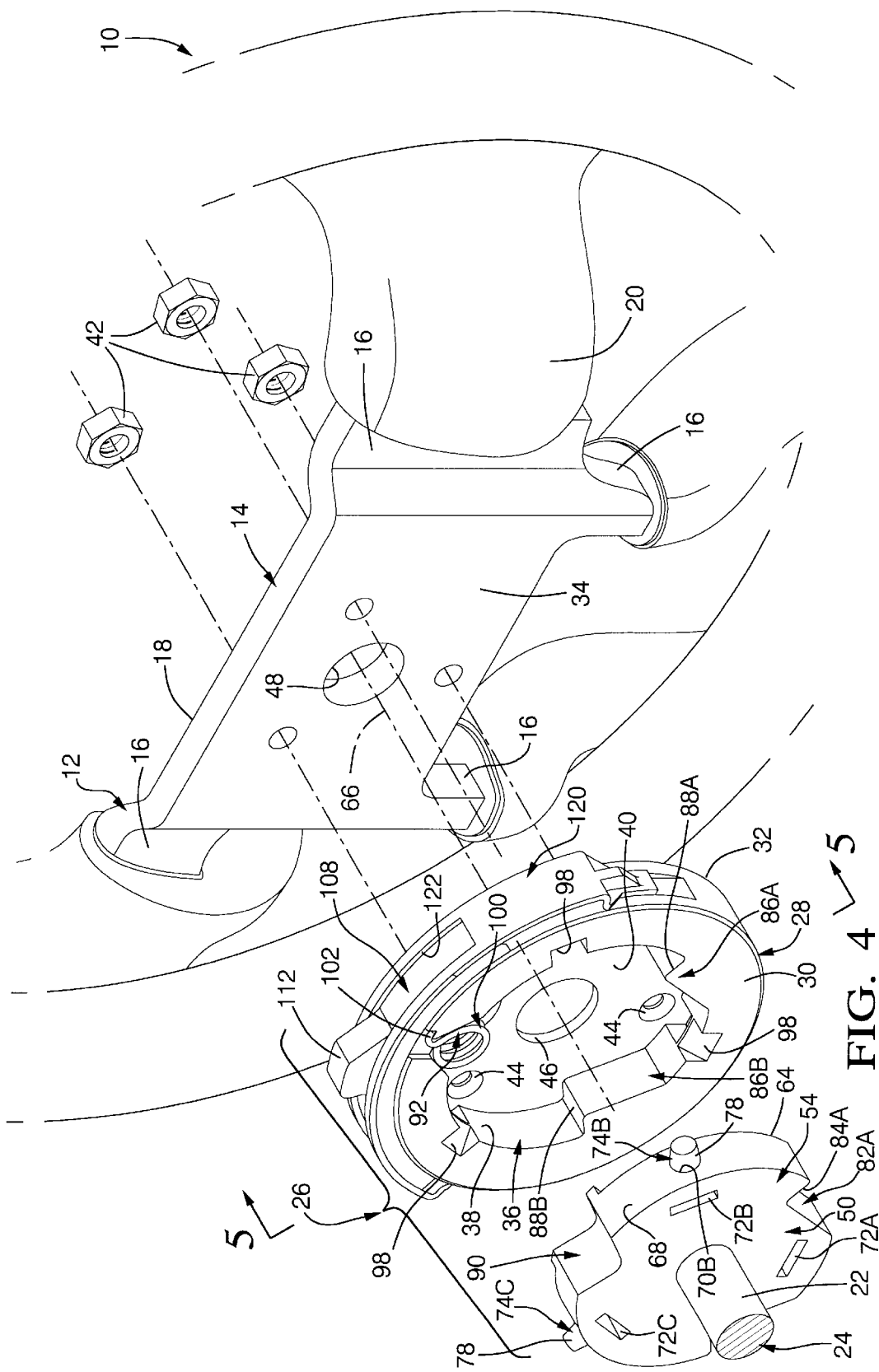
FIG. 4 is an exploded perspective view of the coupling according to this invention.

As seen best in FIGS. 1 and 4, a fragmentarily illustrated motor vehicle steering wheel 10 includes a rigid structural element 12 having a planar segment 14 in the middle of the steering wheel and a plurality of integral spokes 16 between the planar segment and a rim, not shown, of the structural element. A surface 18 of the planar segment 14 faces toward a driver, not shown. The spokes 16 and the rim are concealed by an elastomeric cushion 20 molded around the structural element 12. A supplemental inflation restraint module, not shown, attaches to the planar segment 14 over the surface 18 thereof. The steering wheel 10 is coupled to a distal end 22 of a motor vehicle steering shaft 24 by a coupling 26 according to this invention.

A disc-shaped socket element 28 of the coupling 26 has an exposed first planar side 30 and a second planar side 32 seated flush against a surface 34 of the planar segment 14 of the structural element 12 of the steering wheel opposite the surface 18 of the latter. A primary socket 36 in the socket element 28 is open through the exposed planar side 30 of the latter and has a cylindrical inside wall 38 and a base 40 at the bottom of the cylindrical inside wall. The socket element 28 is rigidly clamped to the planar segment 14 of the structural element of the steering wheel 10 by a plurality of fasteners 42 in a corresponding plurality of recesses 44 in the base 40. A center aperture 46 in the base 40 registers with a center aperture 48 in the planar segment 14.

Figure 2:
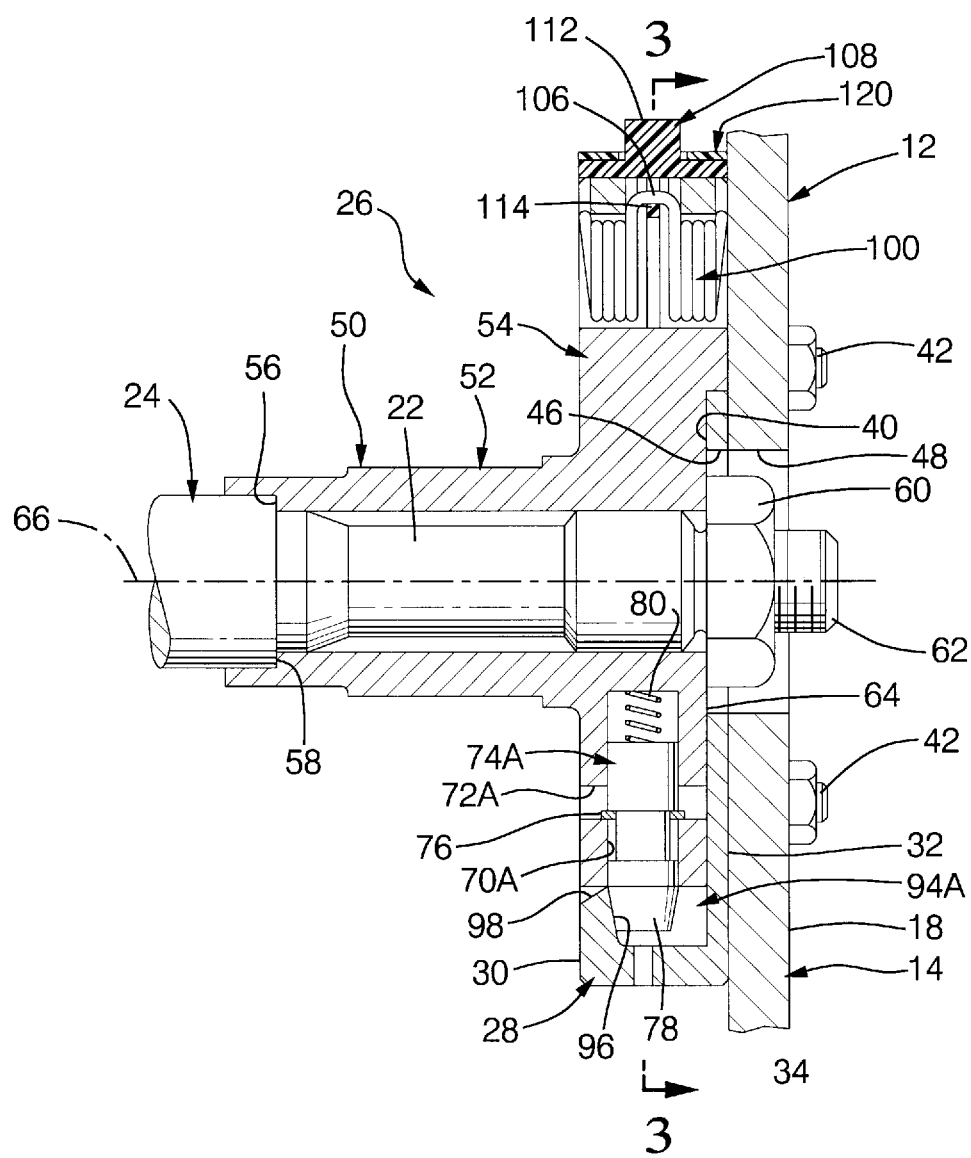
FIG. 2 is an enlarged sectional view taken generally along the plane indicated by lines 2—2 in FIG. 1.

A hub element 50 of the coupling 26 includes a tubular stem 52, FIG. 2, and an integral disc-shaped hub 54. The distal end 22 of the steering shaft 24 fits in the tubular stem 52 with a shoulder 56 on the stem seated against a shoulder 58 on the steering shaft. A nut 60 on a screw thread 62 on the steering shaft seats against a first planar side 64 of the hub 54 to clamp the hub element to the steering shaft for rotation as a unit with the steering shaft about a longitudinal centerline 66 of the latter and for linear translation with the steering shaft in the direction of the longitudinal centerline 66.

Figure 3:
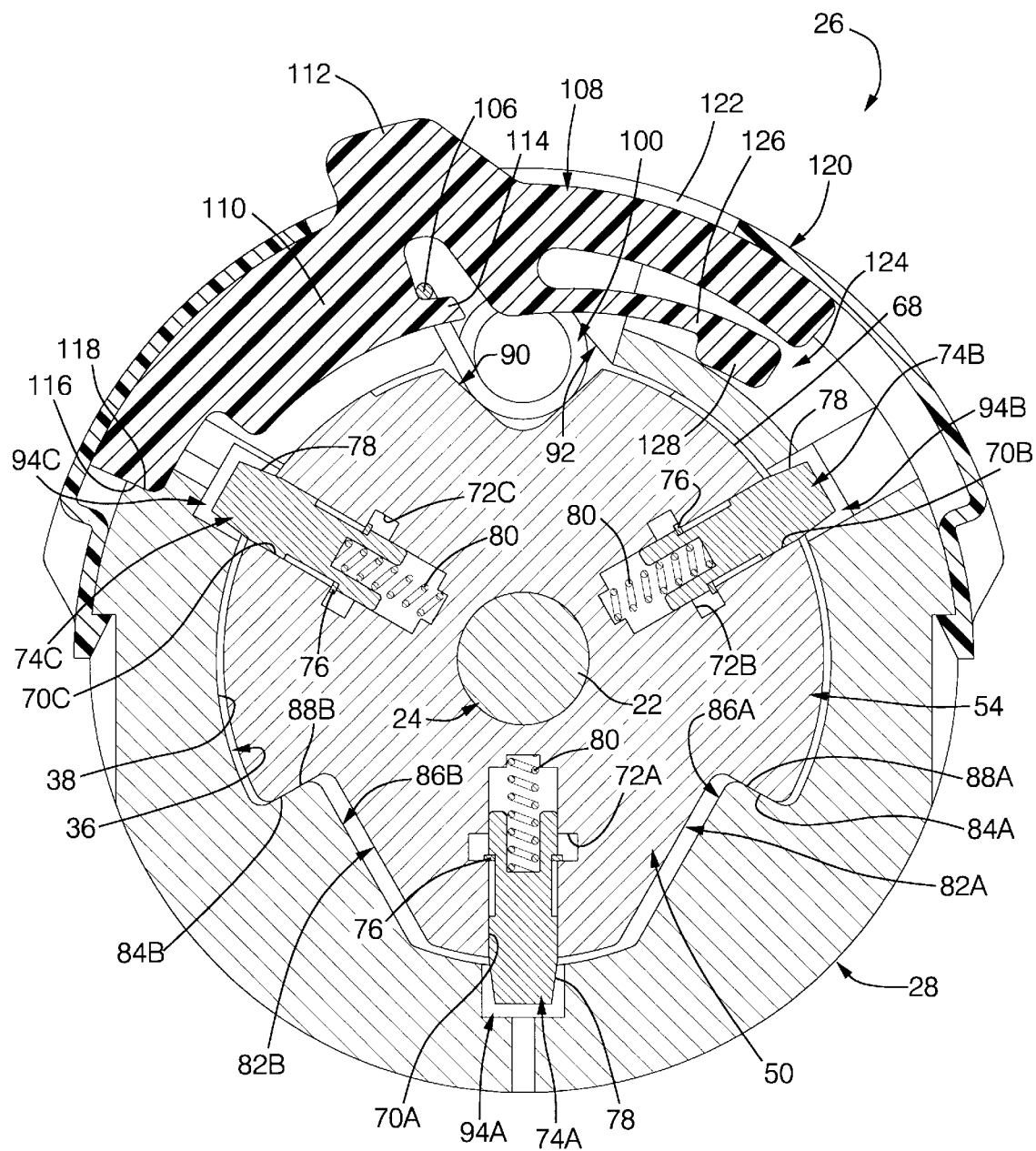
FIG. 3 is a sectional view taken generally along the plane indicated by lines 3—3 in FIG. 2.

As seen best in FIGS. 3 and 4, the hub 54 has a cylindrical outside wall 68 around the longitudinal centerline 66 of the steering shaft and a plurality of three evenly spaced radial bores 70A, 70B, 70C each open through the cylindrical outside wall 68. A plurality of slots 72A, 72B, 72C in the hub 54 perpendicular to respective ones of the radial bores 70A, 70B, 70C intersect the radial bores. Respective ones of a plurality of three plungers 74A, 74B, 74C are slidably disposed in the radial bores 70A, 70B, 70C, respectively. Each plunger has a retaining ring 76 thereon in the corresponding one of the slots 72A, 72B, 72C which cooperate with the slots in limiting outward linear translation of each plunger to an extended position, FIG. 4, in which a frusto-conical end 78 of each plunger is exposed outboard of the cylindrical outside wall 68 of the hub. Respective ones of a plurality of plunger springs 80 in the radial bores 70A, 70B, 70C bias the plungers 74A, 74B, 74C toward their extended positions.

The cylindrical outside wall 68 of the hub 54 is interrupted on opposite sides of the radial bore 70A by a pair of notches 82A, 82B. The notches 82A, 82B terminate at respective ones of a pair of converging shoulders 84A, 84B. The cylindrical inside wall 38 of the primary socket 36 is interrupted by a pair of lugs 86A, 86B. The lugs 86A, 86B terminate at respective ones of a pair of converging shoulders 88A, 88B. The cylindrical outside wall 68 of the hub is further interrupted by a V-shaped notch 90 diametrically opposite the radial bore 70A. The cylindrical inside wall 38 of the primary socket 36 is further interrupted by a V-shaped notch 92 bearing the same positional relation to the lugs 86A, 86B as the V-shaped notch 90 in the hub 54 bears to the notches 82A, 82B therein.

As seen best in FIGS. 2–4, a plurality of three radially oriented secondary sockets 94A, 94B, 94C in the socket element 28 open through and are evenly spaced around the cylindrical inside wall 38 of the primary socket. Each secondary socket has an overhanging end wall 96 therein, FIG. 2. The first planar side 30 of the socket element 28 is interrupted by a plurality of three ramps 98 aligned with respective ones of the secondary sockets 94A, 94B, 94C and intersecting the cylindrical inside wall 38 of the primary socket.

A seated position of the hub 54 in the primary socket 36, FIGS. 1–3, is achieved by linear translation of the hub element 50 toward the socket element 28 in the direction of the longitudinal centerline 66 of the steering shaft until the planar side 64 of the hub seats against the base 40 of the primary socket. In the seated position of the hub 54 in the primary socket 36, the lugs 86A, 86B nest in the notches 82A, 82B with the shoulders 88A, 88B of the lugs facing the shoulders 84A, 84B of the notches and the V-shaped notches 90, 92 face each other and cooperate in defining a polygonal chamber between the hub and the primary socket.

Prior to the hub achieving its seated position, the ramps 98 engage the frustoconical ends 78 of the plungers 74A, 74B, 74C and cam the plungers inward against the springs 80 until each plunger clears the cylindrical inside wall 38 of the primary socket. When the seated position of the hub in the primary socket is attained, the springs 80 thrust the plungers 74A, 74B, 74C into the secondary sockets 94A, 94B, 94C and effect line contact between the frustoconical ends 78 of the plungers and the corresponding ones of the overhanging end walls 96 of the secondary sockets to eliminate dimensional clearance, i.e., lash, between the hub and the primary socket which would otherwise permit relative linear translation therebetween in the direction of the longitudinal centerline 66 of the steering shaft. The plungers 74A, 74B, 74C also cooperate with the overhanging end walls 96 in preventing dislodgment of the hub from the primary socket.

Referring to FIGS. 2–5, a cylindrical coil spring 100 of the coupling 26 is wedged in the polygonal chamber defined by the V-shaped notches 90, 92 tangent to the planar sides of each with a pair of end hooks on the coil spring bearing against the hub element 50, only a single end hook 102 being visible in FIG. 4. The coil spring thrusts the hub 54 laterally, i.e., perpendicular to the longitudinal centerline 66 of the steering shaft, in the primary socket 36 until the shoulders 84A, 84B of the notches 82A, 82B seat flush against the shoulders 88A, 88B of the lugs 86A, 86B.

By virtue of the convergence of the shoulders 84A, 84B and of the shoulders 88A, 88B, the hub 54 is wedged against the primary socket 36 opposite the polygonal chamber defined by the V-shaped notches 90, 92 to eliminate dimensional clearance, i.e., lash, between the hub and the primary socket which would otherwise permit relative linear translation therebetween perpendicular to the longitudinal centerline 66 of the steering shaft. At the same time, torque applied to the socket element 28 at the steering wheel 10 in either direction is transferred to the hub element 50 and the steering shaft 24 by reaction between the shoulders 84A, 84B and 88A, 88B and by reaction of the planar sides of the V-shaped notches 90, 92 against the coil spring 100 with zero dimensional clearance, i.e., lash, between the hub and the primary socket which would otherwise permit relative rotation therebetween about the longitudinal centerline 66 of the steering shaft.

Figure 5:
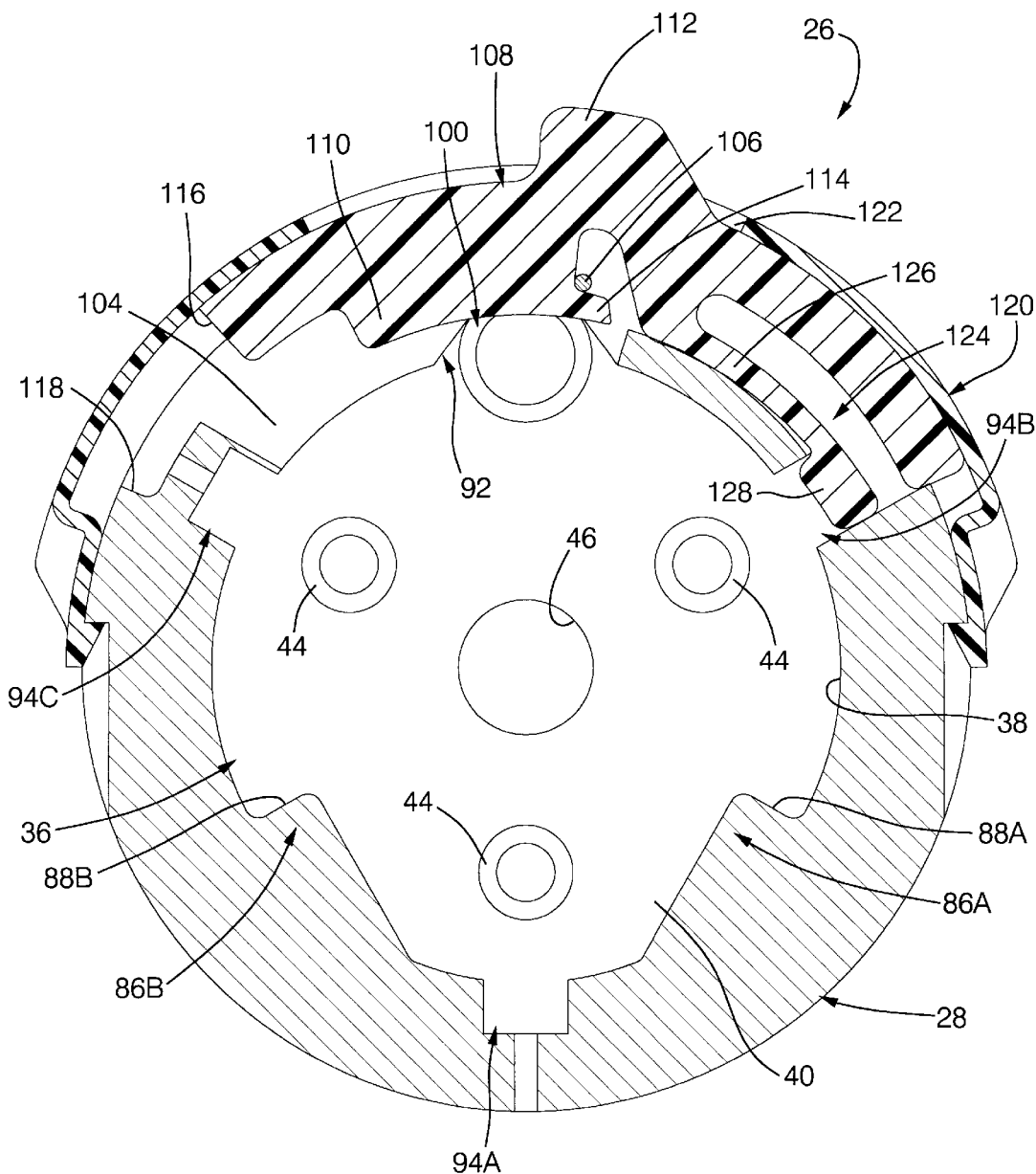
FIG. 5 is a view taken generally along the plane indicated by lines 5—5 in FIG. 4.

An arc-shaped slot 104, FIG. 5, in the socket element 28 intersects the V-shaped notch 92 and receives a center hook 106 of the cylindrical coil spring 100. The slot 104 also intersects the secondary socket 94B radially outboard of where the secondary socket 94B intersects the cylindrical inside wall 38 of the primary socket. A plastic retractor 108 of the coupling 26 is disposed in the arc-shaped slot 104 for back and forth linear translation in an arc about the centerline 66 of the steering shaft 24.

The retractor 108 has a web 110 in the arc-shaped slot 104 and a finger tab 112. A lip 114 on the web 110 is captured in the center hook 106 of the coil spring 100 so that clockwise linear translation of the retractor, FIGS. 3 and 5, twists the coil spring in a direction in which the diameter of the coil spring becomes smaller. Conversely, the resilience of the spring 100 induces counterclockwise linear translation of the retractor in the slot 104 corresponding to expansion of the diameter of the spring to a position, FIG. 3, defined by engagement of an end 116 of the retractor against an end 118 of the slot 104. A plastic retainer 120 clipped onto the socket element 28 over the retractor prevents dislodgment of the retractor from the slot 104. The finger tab 112 protrudes through an elongated window 122 in the retainer.

A latch 124 of the coupling 26 consists of an arc-shaped cantilever spring 126 integral with the web 110 of the retractor and an integral lug 128 on the end of the cantilever spring. The cantilever spring biases the lug 128 to a latched position, FIG. 5, in the secondary socket 94B. In its latched position, the lug 128 retains the retractor 108 in the position thereof corresponding to the coil spring 100 being twisted to a minimum diameter against the bias of the coil spring urging the retractor toward the end 118 of the arc-shaped slot.

With the lug 128 in the secondary socket 94B and the coil spring 100 thus twisted to its minimum diameter, linear translation of the hub 54 to its seated position in the primary socket 36 is unimpeded by the coil spring. As the hub 54 nears its seated position and the plunger 74B is thrust by the corresponding one of the springs 80 toward its extended position in the secondary socket 94B, the plunger 74B engages the lug 128 on the cantilever spring 126 and ejects the lug from the secondary socket 94B to unlatch the retractor 108 for linear translation toward the end 118 of the arc-shaped slot 104. With the retractor unlatched, the coil spring 100 untwists and expands in the polygonal chamber defined by the V-shaped notches 90, 92 to tangency with the planar sides of the V-shaped notches thereby to couple the hub 54 and the primary socket 36 for unitary rotation with zero lash therebetween as described above.

To remove the hub 54 from the primary socket, force is applied at the finger tab 112 to effect clockwise linear translation of the retractor 108 to twist the coil spring 100 to its minimum diameter. At the same time, the plungers 74A, 74B, 74C are pushed out of the secondary sockets 94A, 94B, 94C by tools, not shown, inserted into the radial bores 70A, 70B, 70C from outboard of the plungers. When the hub is removed from the primary socket, the cantilever spring 126 thrusts the lug 128 into the secondary socket 94B to latch the retractor against the bias of the cylindrical coil spring 100.

Having thus described the invention, what is claimed is:

1. In combination with a motor vehicle steering shaft and a motor vehicle steering wheel, a coupling comprising:

a socket element on said steering wheel, a hub element on said steering shaft, a primary socket in said socket element, a hub on said hub element adapted for plug-in reception in said primary socket to a seated position in said primary socket, an axial retention means operative in response to said hub achieving said seated position in said primary socket to prevent dislodgment of said hub from said primary socket and to eliminate lash between said hub and said primary socket in the direction of a longitudinal centerline of said steering shaft, a pair of angularly converging, generally flat shoulders formed integrally on said hub peripherally at one side thereof, a pair of angularly converging, generally flat shoulders in said primary socket facing said pair of converging shoulders on said hub in said seated position of said hub in said primary socket, a pair of notches in respective ones of said hub, at a peripheral side thereof opposite its said shoulders, and of said primary socket and facing each other in said seated position of said hub in said primary socket and cooperating in defining a polygonal chamber between said hub and said primary socket, and a cylindrical coil spring mounted on said socket element and wedged in said polygonal chamber to thrust together said converging shoulders on said hub and in said primary socket to eliminate lash between said hub and said primary socket perpendicular to said longitudinal centerline of said steering shaft and to transfer torque between said hub and said primary socket with zero angular lash around said longitudinal centerline of said steering shaft.

2. The coupling between a motor vehicle steering shaft and a motor vehicle steering wheel recited in claim 1 wherein:

each of said notches in said pair of notches in respective ones of said hub and said primary socket facing each other in said seated position of said hub in said primary socket and cooperating in defining a polygonal chamber between said hub and said primary socket is a V-shaped notch.

3. The coupling between a motor vehicle steering shaft and a motor vehicle steering wheel recited in claim 2 further comprising:

a retractor means operative to twist said cylindrical coil spring in said polygonal chamber to a minimum diameter for release of said coil spring from each of said pair of V-shaped notches in said hub and in said primary socket, and a latch means operative to latch said retractor means in a position thereof corresponding to said minimum diameter of said coil spring to permit plug-in reception of said hub in said primary socket and to automatically release said retractor means for expansion of said coil spring in said polygonal chamber when said hub attains said seated position in said primary socket.

4. The coupling between a motor vehicle steering shaft and a motor vehicle steering wheel recited in claim 3 wherein said retractor means comprises:

a hook on said cylindrical coil spring in said V-shaped notch in said primary socket, an arc-shaped slot in said socket element intersecting said V-shaped notch in said primary socket, a retractor mounted in said arc-shaped slot for back and forth linear translation, and a lip on said retractor captured in said hook on said cylindrical coil spring and cooperating therewith in twisting said coil spring to reduce the diameter thereof to said minimum diameter concurrent with linear translation of said retractor in said arc-shaped slot.

5. The coupling between a motor vehicle steering shaft and a motor vehicle steering wheel recited in claim 4 wherein said axial retention means operative in response to said hub achieving said seated position in said primary socket to prevent dislodgment of said hub from said primary socket and to eliminate lash between said hub and said primary socket in the direction of said longitudinal centerline of said steering shaft comprises:

a radially oriented secondary socket in said socket element intersecting each of said primary socket and said arc-shaped slot, a plunger supported on said hub for radial reciprocation relative to said longitudinal centerline of said steering shaft having an extended position protruding beyond a cylindrical outside wall of said hub, a plunger spring biasing said plunger toward said extended position thereof, a ramp on said socket element aligned with said secondary socket engageable on said plunger when said hub is plugged into said primary socket and operative cam said plunger into said hub against said plunger spring to permit said hub to achieve said seated position in said primary socket, and an overhanging end wall in said secondary socket engageable by said plunger when said plunger is thrust into said secondary socket by said plunger spring and operative to convert the thrust of said plunger spring into thrust between said plunger and said socket element parallel to said longitudinal centerline of said steering shaft.

6. The coupling between a motor vehicle steering shaft and a motor vehicle steering wheel recited in claim 5 wherein said latch means operative to latch said retractor means in a position thereof corresponding to said minimum diameter of said coil spring and to automatically release said retractor for expansion of said coil spring when said hub attains said seated position in said primary socket comprises:

a cantilever spring on said retractor, and a lug on said cantilever spring biased by said cantilever spring into said secondary socket in the position of said retractor corresponding to said coil spring having said minimum diameter and ejected by said plunger from said secondary socket into said arc-shaped slot when said hub achieves said seated position in said primary socket.

* * * * *